United States Patent [19]

Bambara et al.

[11] 4,011,798
[45] Mar. 15, 1977

[54] METHOD OF MAKING SHIPPING BAG

[75] Inventors: John D. Bambara, Osterville; Dennis Knaus, Centerville, both of Mass.

[73] Assignee: Packaging Industries, Inc., Hyannis, Mass.

[22] Filed: Oct. 24, 1975

[21] Appl. No.: 625,700

Related U.S. Application Data

[62] Division of Ser. No. 419,923, Nov. 29, 1973, abandoned.

[52] U.S. Cl. .............................. 93/35 R; 93/DIG. 1
[51] Int. Cl.² ......................................... B31B 39/60
[58] Field of Search .......... 206/313, 523; 229/48 T, 229/53, 62, 69, 80; 93/35 R, 33 H, DIG. 1

[56] References Cited

UNITED STATES PATENTS

| | | | |
|---|---|---|---|
| 2,962,158 | 11/1960 | Struthers | 229/53 |
| 3,256,527 | 6/1966 | Studen | 229/68 |
| 3,317,038 | 5/1967 | Bade et al. | 206/313 |
| 3,595,468 | 7/1971 | Repko | 229/62 X |
| 3,768,724 | 10/1973 | Hill | 229/53 |
| 3,867,874 | 2/1975 | O'Neil | 93/61 R |

*Primary Examiner*—James F. Coan
*Attorney, Agent, or Firm*—Brumbaugh, Graves, Donohue & Raymond

[57] ABSTRACT

An improved cushioned shipping bag is disclosed, together with a unique method of continuously making the bags. The improved bag protects objects from being damaged when they are transported, shipped, handled or sent in the mail. A continuous layer of foamed plastic sheet material is positioned on and affixed (laminated) to a continuous layer of relatively thin sheet material. The laminated layers are then folded with the foamed plastic sheet material positioned on the inside; the folded laminated layers are subsequently heat sealed, glued or the like together at predetermined positions along the continuous laminate. The cushioned bag blanks subsequently are cut from the continuous laminate. In this manner, three sides of each bag are sealed and one end is left open for insertion of the objects to be shipped. The open end of the bag is provided with a foldable flap which is used to seal the bag after the objects are placed inside it.

8 Claims, 12 Drawing Figures

METHOD OF MAKING SHIPPING BAG

This is a division of application Ser. No. 419,923, filed Nov. 29, 1973, now abandoned.

BACKGROUND OF THE INVENTION

The present invention relates to an improved cushioned shipping bag and a unique method for continuously making such bag. Cushioned or padded shipping bags are used for mailing or shipping articles such as books, plastic products and other items which might be damaged or injured if not handled carefully and safely.

Numerous types of cushioned or padded shipping bags have been developed and currently are being used today. One such bag, known as the "trapped air bubble" bag, has a layer of relatively stiff paper material on the outside and two layers of a thin plastic sheet material inside, the two layers of plastic material having manufactured and trapped inbetween them a plurality of air bubbles. The air bubbles are uniformly spaced on the plastic material. That bag is relatively inexpensive and of a relatively light weight, but has numerous disadvantages which the present invention overcomes. For example, during handling, it is relatively easy to puncture the trapped air bubbles in the plastic layers of the bag, thus leaving the objects placed inside the bag with little or no protection. Also, where the inside plastic layers with the trapped air bubbles are folded at the corners of the bag and the bag is sealed along its edges, the air bubbles are broken along those edges thus again offering little or no protection against damage.

Further, little protection for the objects in the trapped air bubble bag is provided by the thin plastic film between the air bubbles. For example, if a sharp corner of some foreign object were to be placed against or strike the bag in the spaces between the air bubbles, the sharp object would impinge directly upon the objects inside the bag.

Moreover, the trapped air bubble layer is thin and flexible and in order for the bag itself to be relatively stiff and thus be strong enough to be handled in a normal fashion, the paper on the outside of the bag has to be relatively thick, such as on the order of 60 pounds per ream. Also, the trapped air bubble bag is relatively easy to tear. Once a tear break is formed in the outside surface, that tear can spread easily through the bag thus possibly leading to the injury or destruction of the objects inside it.

Another carrier bag that is in use today has as the cushioning material, paper waste, finely divided paper material, cotton waste, fabric waste, or the like. The waste is used as a filler and is placed between two sheets of paper. The paper is then folded and the edges sealed forming a bag. That bag also has numerous disadvantages which the present invention overcomes, however. For example, the stuffing is relatively uneven and the final bag has a rough or wrinkled outer surface on many occasions. Also, in order to prevent the outside layer of the bag from being punctured and the filler from escaping, the bag is made from relatively thick paper, on the order of 60 pounds per ream. The filler itself is loosely held inbetween the paper layers and once the bag is punctured, can escape and create an unsightly mess. Some waste fillers are of a very fine texture and, if the bag is accidently punctured and the filler falls on carpeting or similar surfaces, it is difficult to clean up.

Again, like the trapped air bubble bag, the filler-type bag is relatively easy to tear and thus often exposes its contents to damage or injury. Further, when the filler-type bag is compressed at the edges in order to seal them to form the completed bag, the cushioned layer is compressed to such an extent that it has the same effect as merely a third layer of paper and thus the bag itself provides limited protection at the corners and edges.

Another bag utilizes one or more layers of corrugated paper as the cushioning layer. The corrugated layers are placed between two layers of relatively thick paper and the bags are cut and formed from the laminate. That bag, however, has many of the same disadvantages that the trapped air bubble bag and the filler-type bag have. The corrugated-type bag is susceptible to damage along its edges and to puncture on its surfaces.

A bag having a foamed plastic liner has been introduced, but without significant success. To make that bag, a paper envelope blank is cut from the roll stock and a piece of foamed plastic is cut from the plastic stock. The two layers are then positioned one on top of the other and affixed together in some manner, such as by gluing. The bag blank is then folded to form the completed bag. Such bags do not lend themselves to high volume continuous production, and consequently, they are not commercially competitive with the trapped air bubble bag or the filler-type bag. Moreover, difficulties inherent in their design result in non-uniform appearance; often, the plastic material protrudes beyond the edge of the bag, creating an unsightly appearance. More importantly, such bags lack protection along their bottom edge. Thus, the contents of such a bag are susceptible to being injured by items striking the bottom of the bag. Also, if the objects inside the bag have any sharp corners, the objects themselves can easily puncture the bag at the bottom, leading to their possible loss or injury.

SUMMARY OF THE INVENTION

An improved cushioned shipping bag which overcomes the aforementioned problems associated with cushioned bags is disclosed herein. A continuous layer of foamed plastic sheet material is firmly secured, such as by an adhesive, to a continuous layer of a relatively thin paper or other material having like characteristics to form a laminate. The paper or like material forms the outer surface of the finished bag. At predetermined places along the laminate, heat seals are formed which define the outer edges of the bag. The bag blanks are then cut from the continuous laminate and folded; although in one embodiment of the invention, the laminate is folded before it is heat sealed and cut into bag blanks. After the bag blanks are cut, any further heat sealing is then conducted to form the completed bag. One end of the bag is left open for insertion of the objects to be transported or shipped and a foldable flap preferably is provided to close the open end of the bag after the contents are placed inside.

BRIEF DESCRIPTION OF THE DRAWINGS

The invention will be more completely described in reference to the following drawings in which.

DESCRIPTION OF THE PREFERRED EMBODIMENT

Figure 1:
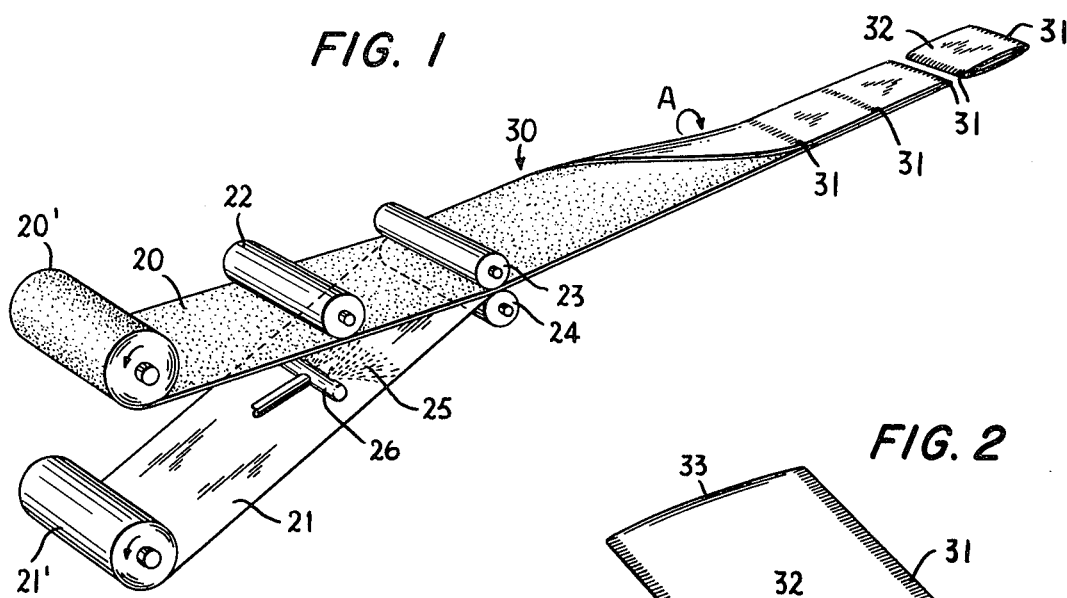
FIG. 1 shows a method of making the mailing bag.

FIG. 1 shows the preferred method of making the improved cushioned shipping bag. A sheet of foamed plastic material 20 and a sheet of a relatively thin paper-like material 21 are fed continuously from rolls toward and into an apparatus which performs various functions on the materials to form the shipping bags. The two layers of material 20 and 21 are fed by series of rollers 22 (only one of which is shown) toward a pair of rollers 23 and 24 which laminate the two layers together.

Prior to passing through rollers 23 and 24, a glue or adhesive 25 is applied between the two layers. A conventional spray-type apparatus 26 is positioned between the two layers of material 20 and 21 and utilized to spray the adhesive 25 onto either one or both of the two layers. Thus, when the two layers 20 and 21 pass through rollers 23 and 24, the adhesive permanently affixes and laminates the two layers together. Alternatively, one or more ribbons of adhesive may be applied along the edges of the two layers to join them.

As the laminated material (indicated by number 30 in FIG. 1) passes through the rollers 23 and 24, it is folded approximately in half by conventional folding guides or like apparatus. The fold takes place approximately at point A in FIG. 1 and the arrow indicates the manner in which the laminate 30 is folded.

As the folded laminate proceeds through the apparatus in a continuous manner, a number of heat sealing means (described below) are used to seal together the laminate at predetermined spaced locations. The areas of heat seal are indicated by numbers 31 in FIG. 1. A conventional cutter or trimmer (not shown) then cuts the folded laminate along the sealed areas 31 into individual bags 32. As will be understood, the laminate is fed through the seal and trim stations in continuous but incremental fashion, each increment of movement being equal to the width of one or more finished bags, depending on the number of sealing and trimmer stations provided.

Figure 2:
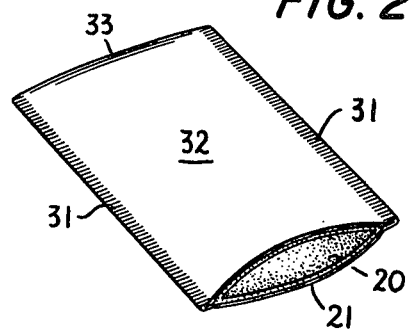
FIG. 2 shows a bag formed by the process of FIG. 1.

One of the individual bags 32 is shown in more detail in FIG. 2. The bag has the layer of paper-like material 21 on the outside and the layer of foamed plastic material 20 on the inside. The closed end or bottom of the bag 33 is formed by the folding step described in reference to FIG. 1. Heat seals 31 are provided on both sides of the bag 32. When the heat seals 31 are formed in the initial process of forming the bag blanks, the heat seals should be approximately twice the width desired on the final bag 32. In this manner, when the individual bags 32 are cut or separated from one another, a sufficient area of heat seal 31 will remain on each of the completed bags.

The bag 32 shown in FIG. 2 may be employed for safely transporting and shipping many objects of diverse shapes and materials. After an object is placed inside the bag, the open end of the bag is heat sealed, stapled or glued to form a closed shipping bag.

Figure 3:
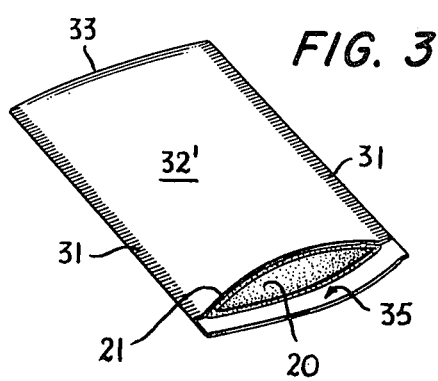
FIG. 3 shows another embodiment of the mailing bag.
Figure 4:
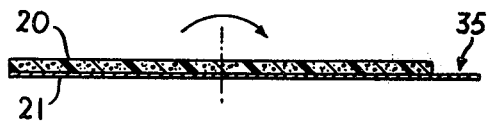
FIG. 4 is a cross-section of the bag blank used to form the bag shown in FIG. 3.

FIG. 3 shows a second embodiment of the shipping bag. The bag 32' is similar to the bag shown in FIG. 2 except that a foldable flap 35 is provided for sealing the bag. The process for producing the bag 32' is essentially the same as that described with reference to FIG. 1 to form bag 32 (FIG. 2) except that the paper-like layer 21 is provided slightly wider than the foamed plastic layer 20 along one edge. A cross-section of the laminate used to produce the bag 32' is shown in FIG. 4.

The paper-like material 21 is wider than the plastic foam material 20 by an amount equal to the length of the flap 35 required. When the laminate is folded, as indicated by the arrow in FIG. 4, the edges are sealed, and the bag 32' is severed from the continuous string of bag blanks, the bag such as that shown in FIG. 3 is formed. After the objects to be shipped are placed inside bag 32', the user merely folds over the flap 35 and seals it. To ensure sealing, a hot melt or water-active adhesive is preferably placed along the flap portion 35 of the bag blanks. The adhesive can be applied on the flap portion 35 by any conventional applicator means (not shown) and at any stage of the bag making process.

Figure 5:
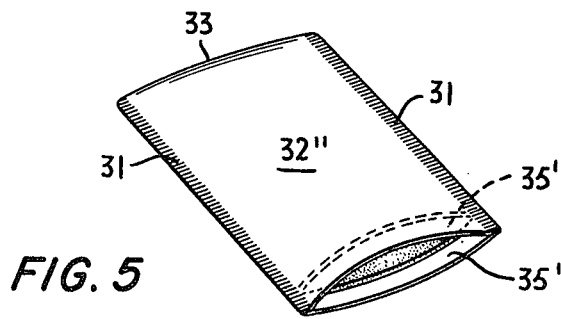
FIG. 5 shows still another embodiment of the shipping bag.

Another embodiment of the bag formed by the process shown in FIG. 1 is illustrated in FIG. 5. In this bag 32", two foldable flap portions 35' are formed. Each of the flap portions 35' preferably has a hot melt or water-active adhesive applied on it during the bag forming process and thus the two flaps are capable of being easily sealed together by the user forming a closed bag.

The bag embodiment 32" is formed in a similar manner to the bags 32 and 32', except that the foamed plastic material layer 20 is narrower than the paper-like material 21 along both sides of the material 21. Two flap portions are thus provided. When the laminate 30 is folded, a bag blank such as that shown in FIG. 5 is formed.

The material used for layer 20 can be any foamed plastic material, but preferably is polyethylene foam which has achieved good results. The foamed plastic layer is on the order of 3/32 to ⅛ inch thick. The plastic material has an uncountable number of minute trapped air bubbles within its structure, thus providing a cushioned effect. The plastic layer itself is relatively stiff and provides the necessary stiffness and bag integrity so that the completed bag can be handled and transported with little risk of damage.

The plastic foamed material provides a better cushioning effect than that provided by the trapped air bubble, filler-type and corrugated-type bags. The plastic material also provides improved insulation against temperature changes to which the bag might be subjected during mailing and is essentially moisture-proof.

The paper-like material 21 preferably is kraft paper and can be relatively thin. Due to the stiffness of the plastic foam material 20, the paper-like layer 21 can be much thinner than the paper material used in the trapped air bubble, filler-type and corrugated-type bags described above. For example, paper on the order of 30 pounds per ream can be used in the present invention.

The invention thus provides a bag which utilizes less paper products and is less expensive to construct.

The present invention provides strong, safe, cushioned protection for objects which must be shipped or mailed. The improved bag is attractive and can be imprinted with the manufacturers name in an easy manner. The use of the foamed plastic inner layer provides a light-weight cushioned bag that is flexible, tear resistant and of a uniform thickness throughout.

Figure 6:
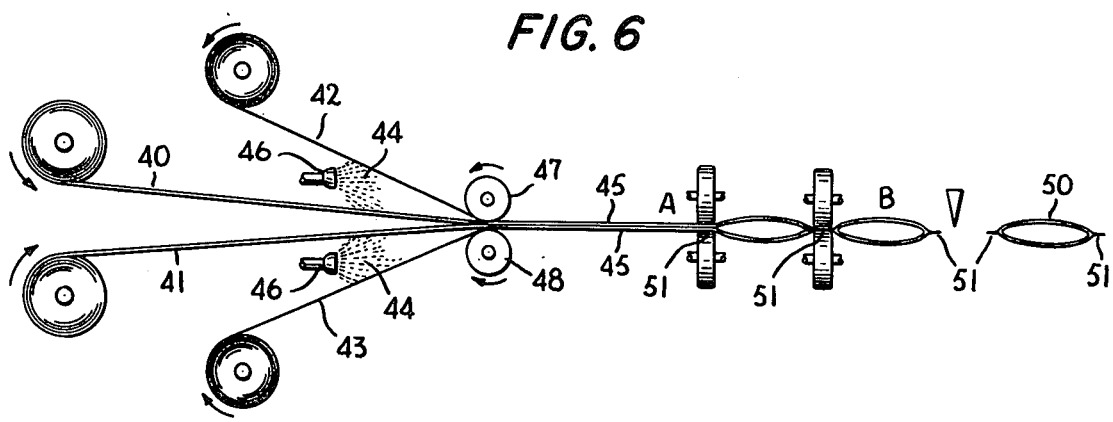
FIG. 6 shows another method of making the mailing bag.

FIG. 6 shows another method of making the improved mailing and shipping bag. In this process, two continuous layers of plastic material 40 and 41 and two continuous layers of paper-like material 42 and 43 are provided. Each of the four layers comprise approximately the length of a completed bag 50; a folding step is not required. The layers of plastic and paper material are related in pairs and each pair of layers has an adhesive 44 applied between the separate layers to form two laminates 45. The adhesive 44 is applied by a spray-type apparatus 46 similar to the apparatus 26 shown and described with respect to FIG. 1. A pair of rolls 47 and 48 are provided to seal and laminate the pairs of materials together. In the construction shown in FIG. 6, foamed plastic layer 40 is laminated to paper-like layer 42 and foamed plastic layer 41 is laminated to paper-like layer 43. As the laminates 45 proceed through the apparatus, they are subject to heat sealing and cutting steps (similar to those described with reference to FIG. 1) to form individual bags 50.

Unlike the process shown in FIG. 1 in which the bottom end of the bag is formed by the folding step, the bottom edges of the bag 50 must be heat sealed or otherwise joined together. The bottom edge 52 can be heat sealed in the same manner that the side edges 51 are heat sealed. The process for sealing the bottom of the bag 52 can be carried out at any time during the formation of the completed bags. For example, the bottom 52 can be heat sealed prior to the formation or sealing of the edges 51 (position A in FIG. 6), prior to the cutting of the bags into individual bags (position B), or after the bags are cut into individual bags 50.

Figure 7:
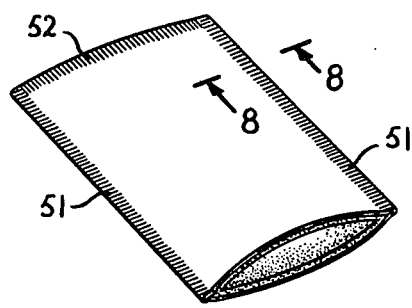
FIG. 7 shows a bag formed by the process of FIG. 6.

A bag produced by the process shown in FIG. 6 is shown in FIG. 7. The open end of the bag 50 can be sealed in the same manner as the bag shown in FIG. 2. It is also possible to provide the foam plastic layers 40 and 41 and the paper-like layers 42 and 43 of different widths so that one or more foldable or sealable flaps are formed on the completed bag 50. This could be done in the same manner as heretofore described with reference to FIGS. 3–5.

Figure 8:
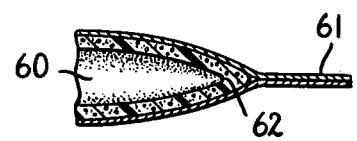
FIG. 8 illustrates an enlarged cross-sectional view of a portion of the edge of the bag.
Figure 9:
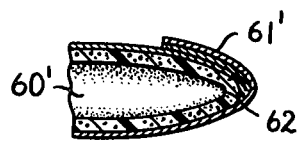
FIG. 9 illustrates the bag shown in FIG. 8 with the sealed edge portion folded over on the bag.

Although it is possible, and in some uses preferable, to leave the edges of the bags of FIGS. 2, 3, 5 and 7 as shown, namely with the sealed edges extending approximately parallel to the outside surfaces of the bag, it is desirable in certain cases to fold the sealed edges over forming a slightly smaller bag with rounded edges. Cross-sections of the edges of two completed bags 60 and 60' are shown in FIGS. 8 and 9, one bag 60 having its sealed edges 61 unfolded (FIG. 8) and the other bag 60' having its edges 61' folded over (FIG. 9). The interior size of the bag is not affected by the edge-folding process; the edge-fold only affects the outside width (and possibly the length) of the bag. To fold the sealed edge portion 61', any conventional folding apparatus can be used. A hot melt or an adhesive material is applied along one or both of the surfaces in which the edge 61' is to be folded and by the combination of heat and pressure, the flap 61' can be affixed to the surface of the bag 60'.

Both the folded and unfolded edge embodiments illustrated by FIGS. 8 and 9 offer the basic advantages of the invention. Both provide additional protection at the edges of the bag against damage to the contents of the bag. Also, the folded bag 61' is slightly smaller in size and thus utilizes slightly less storage space.

FIGS. 8 and 9 also illustrate another advantageous feature of the invention. When the edges of the bag are sealed under heat and pressure, the foamed inner plastic layers tend to fuse together, forming generally rounded interior corner areas 62 inside the bag. That feature provides additional protection for the objects inside the bag, making objects with sharp corners less apt to puncture through the cushioning material at the edges and corners of the bag. It also insures a more complete barrier to protect the contents of the bag from dampness and moisture. If the plastic material is fused together on all sides of the bag, the inside of the bag is rendered impervious to most external weather conditions.

Figure 10:
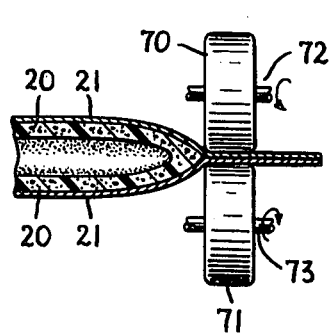
FIG. 10 shows an apparatus for sealing the edges of the bag.

The sealing apparatus preferably used to seal or heat-seal the edges of the improved bags together is shown in FIG. 10. A pair of rollers 70 and 71 are provided which roll back and forth across the laminate 30 (FIG. 1) sealing the layers of laminate together at spaced predetermined locations. The rollers 70 and 71 turn on axles 72 and 73 and are driven by any conventional means (not shown). Since bags are formed in a continuous manner, the rollers 70 and 71 are adapted either to separate and return to a starting position or move across and then back over the laminate to complete a sealing step and then await the next incremental movement of the laminate.

In order to provide a sufficient seal and also to fuse the foamed layers together forming the improved feature described with reference to FIGS. 8 and 9, the rollers 70 and 71 preferably should be heated. The rollers can be heated electrically, by the circulation of a heating fluid therein, or by any other conventional manner.

To ensure that the bags are adequately and permanently sealed together by the rollers 70 and 71, it is preferable to apply a strip of a hot melt or adhesive along the area of the laminate between the plastic layers where the bag is to be sealed. The hot melt can be applied to the laminate 30 prior to the folding step indicated at A in FIG. 1. Any conventional applicator apparatus (not shown) can be used for applying the hot melt. The use of the hot melt provides an improved seal and moisture barrier as the two layers of paper 21 are permanently fused together. The force of the roller and the effect of the heat collapses the plastic foam material along the seals.

One unforeseen and highly advantageous feature of the improved bag is that the open end remains slightly open for easy filling thereof. Although it is not certain why that occurs, it is believed that it results from slight stretching of the plastic layer relative to the paper-like material during the laminating procedure and its tendency to return to its original length after the bag is formed ("plastic memory"). However, regardless of the precise reason, a bag made in accordance with the present invention will naturally be slightly open, as shown in FIGS. 2, 3, 5 and 7. This effect can be accentuated by deliberately stretching the foam sheet prior to laminating it to the paper-like material.

Figure 11:
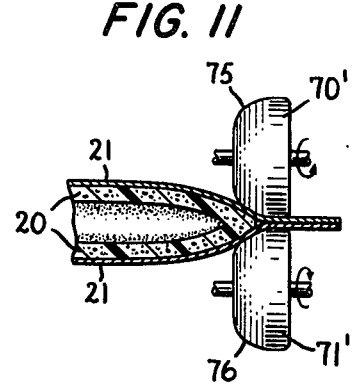
FIG. 11 shows another apparatus for sealing the edges of the bag.

An improved method of heat sealing the bag laminate which helps insure an integral seal of the plastic foam material is shown in FIG. 11. The rollers 70' and 71' are provided with sloping edges 75 and 76. When the laminate is sealed together forming the bag blanks, the upper and lower portions of the bag are joined at a slightly divergent angle from each other and the overlap of the rollers applies heat over a greater portion of the plastic. This provides a better seal between edges of the plastic and is believed to contribute to the ability of the bag to spring open and remain in that position even after being stored in a closed position for a long period of time.

Also, the present invention facilitates the placing of the name of the company or firm using the bags easily and simply on them. As the laminate proceeds through the apparatus, a logo or imprint provided by the company can be placed in a stamp or die and the company name can be imprinted in a continuous manner on the bag. This feature is particularly applicable to the embodiments of the bag having one or more foldable or sealable flaps, such as shown in FIGS. 3 and 5.

Figure 12:
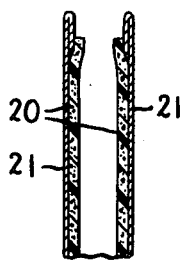
FIG. 12 shows a mailing bag with stiffening ribs on the open end.

It is also possible to add stiffening ribs to the open end of the bag. This feature is shown in FIG. 12. As the paper-like material 21 is pulled from the roll, one or both of the edges are folded over and affixed with a hot melt or adhesive. When the paper-like material 21 subsequently is laminated with the foamed plastic layer 20, a stiffer reinforced bag is formed. It is also possible for the foamed material 20 to overlap the ribbed portion. The less overlap used, however, the less expensive the bags are to construct as the amount of foam used in each bag is reduced.

The feature of the improved bag wherein it remains open for easy stuffing provides for an improved process for filling the bags. If the bags are to be filled by machine, it is much easier and simpler to use bags which are already open to a certain extent so that the machine can open the bags more fully and insert the objects.

The invention has been described with respect to particular embodiments, but it is understood that numerous modifications and changes may occur to those skilled in the art. Any such modifications and changes are included within the scope of the invention as defined by the following claims.

We claim:

1. A method of making a cushioned bag of multilayer material having first and second exterior faces formed by outer surfaces of at least one exterior layer of relatively thin, fibrous, and flexible sheet material, an inner layer lining substantially the entire bag interior and comprising at least one sheet of foamed plastic; the method comprising the steps of:
   automatically bringing together along a path of travel two long sections of the multilayer material,
   positioning surfaces of the foamed plastic of the sections adjacent one another inside the thin, fibrous and flexible sheet of the two sections to form outer layers from the thin, fibrous and flexible sheet,
   joining together the two long sections at intervals spaced along the length thereof to form attached bags of the multilayer material, said step of joining comprising applying sufficient heat and pressure to the two sections at said intervals to entirely collapse the foamed plastic along thin strips transverse to the path of travel and to join the outer layers of the thin, fibrous and flexible sheet substantially face-to-face along the strips, thereby forming a bonded together, two layer, marginal seam area where the outer surface forming, thin, fibrous, and flexible sheets are securely joined together,
   forming adjacent the transverse strips a continuum of the foamed plastic spanning the joined strips inside the bag, said step of forming a continuum including applying less heat and pressure than applied to the transverse strips adjacent the transverse strip towards the bag interior to join the adjacent surfaces of the foamed plastic absent total collapse of the foam, thereby forming a second joined internal seam area that includes the joined foam spanning the marginal seam area adjacent thereto,
   whereby bag seams are formed with an improved seal and cushioning across the seam.

2. The method according to claim 1 wherein the step of joining together at intervals includes bringing into contact with one outer surface of the two long sections a first surface of a first heated sealing member, bringing into contact with the other outer surface of the two long sections a cooperating member opposite the first heated sealing member and pinching the two long sections together along said strips to melt and compress the foamed plastic,
   the step of forming adjacent the strips a continuum of the foamed plastic including bringing into contact adjacent the strips a second, contoured surface of the first heated sealing member, wherein the contoured surface slopes away from the second member sufficiently to avoid complete collapse of the foamed plastic between the contoured surface and the cooperating member.

3. The method according to claim 2 wherein the cooperating member includes a contoured surface opposite the contoured surface of the first heated sealing member and sloping away from the first sealing member, the step of forming a continuum including engaging the two long sections on opposite outer surfaces adjacent the strips with both contoured surfaces.

4. The method according to claim 3, wherein the cooperating member is a second heated sealing member, the steps of joining together at intervals and forming a continuum including applying heat from opposite sides of the two long sections by application of the two members.

5. The method according to claim 1 wherein the step of automatically bringing together along a path of travel two long sections of the multilayer material comprises providing a unitary length of the multilayer material and automatically folding the material to bring the surfaces of foamed plastic adjacent one another.

6. The method according to claim 1 wherein the step of automatically bringing together along a path of travel two long sections of the multilayer material comprises providing two separate lengths of the multilayer material and moving the two separate lengths together with surfaces of the foamed plastic adjacent.

7. A method of making a bag of multilayer material having first and second exterior faces formed by outer surfaces of at least one exterior layer of relatively thin, fibrous, and flexible sheet material, an inner layer lining substantially the entire bag interior and comprising at least one sheet of foamed plastic; the method comprising the steps of:
   automatically bringing together along a path of travel two long sections of the multilayer material,
   positioning surfaces of the foamed plastic of the sections adjacent one another inside the thin, fibrous, and flexible sheet of the two sections to form outer layers from the thin, fibrous, and flexible sheet, joining together the two long sections to form bag edge seams with side-by-side first and second sealed together seam zones, said step of joining comprising pressing at least one heated sealing member against an outer surface of the thin, fibrous, and flexible material to apply sufficient heat and pressure in aligned limited areas of the two sections to form for each bag at least one marginal strip wherein the foam is completely collapsed and the outer thin, fibrous, and flexible sheet is securely bonded together substantially face-to-face to form the first of said side-by-side zones, forming adjacent the marginal strip intersecting segments of uncollapsed foam layers defining the second of said side-by-side zones, integrally joined at heat-fused inner surfaces, and including subjecting the foam at the intersecting segments to a lessened degree of at least one of the applied heat and pressure to fuse the inner foam surfaces without entirely collapsing the foam, whereby across the bag edge seam is formed a continuous foam lining.

8. The method according to claim 1, wherein the thin, fibrous and flexible sheet is lightweight paper having a weight not greater than approximately 30 pounds per ream, and the foamed plastic is foamed polyethylene 3/32 to 1/8 inches thick and sufficiently stiffer than the paper to provide the integrity of the bag, whereby the step of forming integrally joined uncollapsed foam layers continues the structural integrity provided by the foam across the bag seam area.

* * * * *